Figure 1:
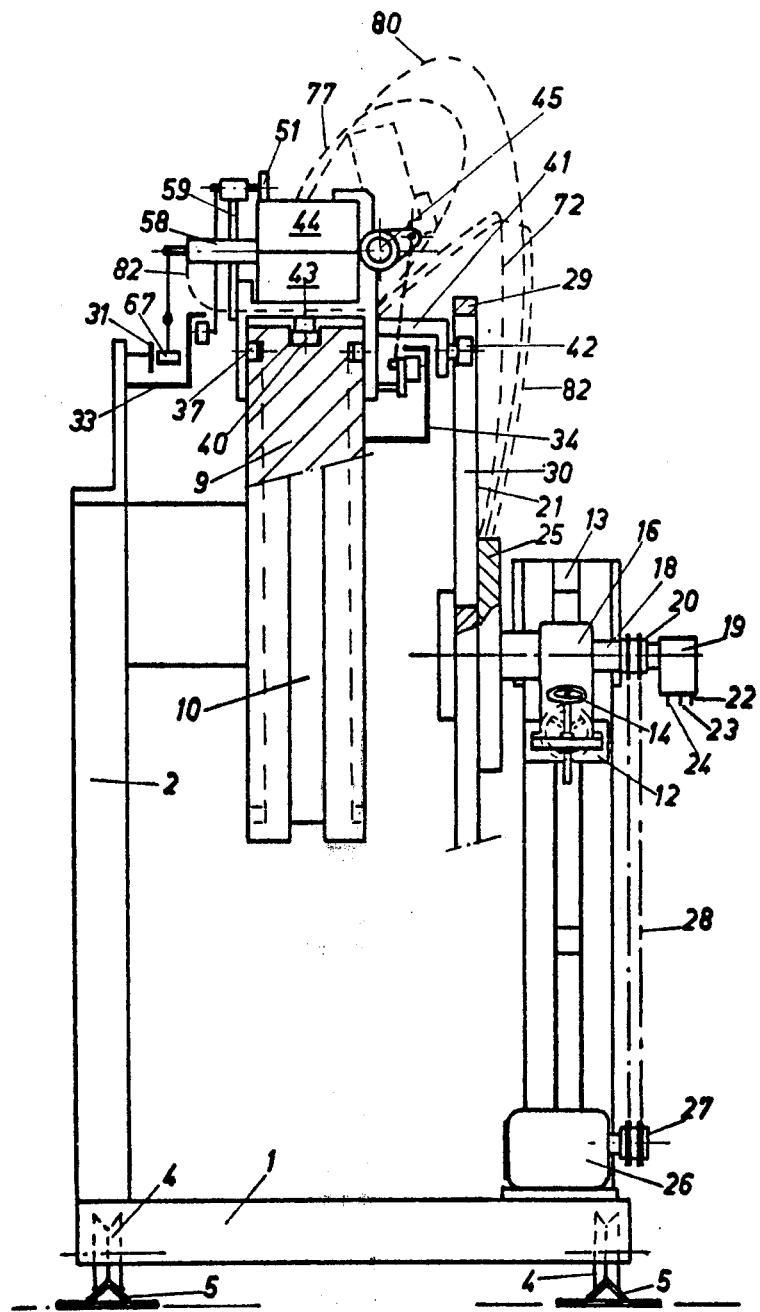

| United States Patent [19] | [11] 3,969,059 |
|---|---|
| Michel | [45] July 13, 1976 |

[54] CONTINUOUS ROTARY APPARATUS FOR BLOW-MOLDING PLASTIC HOLLOW BODIES

[75] Inventor: Edmond Michel, Brussels, Belgium

[73] Assignee: Solvay & Cie, Brussels, Belgium

[22] Filed: June 25, 1974

[21] Appl. No.: 483,071

[30] Foreign Application Priority Data
July 6, 1973   France .............................. 73.25153

[52] U.S. Cl................................. 425/342; 264/99; 425/387 B
[51] Int. Cl.² ......................................... B29C 5/06
[58] Field of Search.......... 425/DIG. 208, DIG. 206, 425/DIG. 211, DIG. 203, DIG. 210, DIG. 216, 242 B, 387 B, 302 B, 305 B, 340, 395, 326 B, 450.1, 451.4, 451.2, 451; 264/99

[56] References Cited
UNITED STATES PATENTS

| 3,025,561 | 3/1962 | Ruekberg et al. ........... | 425/DIG. 211 |
| 3,243,847 | 4/1966 | Fogelberg et al. .............. | 425/326 B |
| 3,685,938 | 8/1972 | Lagoutte............................. | 425/326 |
| 3,733,309 | 5/1973 | Wyeth et al..................... | 425/326 B |

Primary Examiner—Francis S. Husar
Assistant Examiner—R. J. Charvat
Attorney, Agent, or Firm—Spencer & Kaye

[57] ABSTRACT

The invention concerns a continuous rotary apparatus for blow-moulding plastic hollow bodies in which the height of the moulds may be easily changed and which permits a minimum of waste plastic material. This apparatus comprises a fixed framework equipped with a fixed track which carries a plurality of independent moulding units travelling over the track and equipped with a driving device and a device for driving the moulding units which comprises a rotary platen mounted on a shaft which can be moved relative to the fixed framework and is equipped with equidistant slots which act on the driving devices of the moulding units. When the height of the moulds of the moulding units are changed the shaft carrying the rotary platen is displaced relatively to the fixed framework in such a manner that when a mould is in position to be fed with a portion of a continuous hot parison, the preceding mould still fed with a portion of parison is temporarily in contact with it.

11 Claims, 14 Drawing Figures

CONTINUOUS ROTARY APPARATUS FOR BLOW-MOLDING PLASTIC HOLLOW BODIES

The present invention relates to a continuous rotary apparatus for blow-moulding plastic hollow bodies, in which the moulds, arranged in succession, present themselves tangentially to a tubular and rectilinear parison which is delivered continuously, each mould, at the moment at which it comes into position along the axis of the continuous parison, being made to adjoin the preceding mould, and in which the number and/or height of the moulds can easily be varied.

Belgian Pat. No. 723,419 of 6th Nov. 1968 in the name of the applicant company has already disclosed continuous rotary apparatuses for blow-moulding plastic hollow bodies from a tubular parison which is delivered tangentially to the circular trajectory described by the moulds.

The apparatuses of this type generally comprise a first series of half-moulds fixed to a circular rotary support and a second series of half-moulds which are moveable relative to the half-moulds of the first series and co-operate with these. Means are provided for successively closing the moveable half-moulds on to the fixed half-moulds after placing the parison against the fixed half-mould. A fluid under pressure is introduced into the successive portions of parison enclosed in the moulds.

This type of apparatus suffers from a great disadvantage which manifests itself if one wishes to produce hollow bodies of different heights. In effect, in order not to cause an additional loss of plastic in that case, it is necessary not only to change all the moulds but also to change the diameter of the rotary platen which supports the moulds so as to keep these contiguous and thus reduce the loss of plastic to a minimum. This latter modification in turn makes it necessary to shift the greater part of the various devices associated with the moulds and completely to reset the apparatus.

Hence, this type of high-output apparatus only proves economical for the mass production of hollow bodies of constant shape and dimensions.

The applicant company has now developed a continuous rotary apparatus for the blow-moulding of plastic hollow bodies, which is of high output and in which the fitting of moulds of different heights is particularly easy and does not cause loss of plastic, and which also has other advantages.

The invention thus relates to a continuous rotary apparatus comprising a fixed framework, moulds, means of opening and closing the moulds and means for introducing a blowing fluid, which furthermore comprises:

a. a fixed track which is integral with the framework
b. a pllurlaity of independent moveable moulding units which carry the moulds, travel successively over the track and are equipped with a drive device, and
c. a device for driving the moulding units, which comprises a rotary platen mounted on a shaft which can be moved relative to the fixed framework and is equipped with equidistant slots which act on the drive devices of the moulding units.

The track imposes on the successive moulding units a closed trajectory which can be of any shape but of which, preferably, at least one portion is rectilinear or circular.

According to a preferred embodiment, the track of the moulding units consists of a fixed platen located vertically and of appropriate shape, possessing at least one groove, running along its periphery, on each face. The moulding units each consist of a carriage to which is fixed a half-mould. A supplementary moveable half-mould is hinged to the fixed half-mould by means of a hinge system. The moulds thus open and close in book fashion.

The carriage straddles the edge of the fixed platen which constitutes the track and is provided with means such as retaining rollers which co-operate with the grooves provided over the periphery of the faces of the fixed platen.

The apparatus according to the invention can be equipped with any desired number of moulding units. However, the apparatus makes it possible to achieve very satisfactory productivity with a limited number of moulding units. In general, the number of units is between 3 and 20 and preferably between 3 and 12, depending on the dimensions of the hollow bodies to be produced. Of course, the apparatus has a number of slots equal to that of the moulding units.

The means used to cause the moulding units to open and close and to introduce the blowing fluid can be mechanical, pneumatic, hydraulic or electrical.

According to a preferred embodiment, these various means are controlled by fixed devices such as, for example, cams or micro-switches firmly fixed to the fixed framework.

However, it is also possible to control these various signals by means of a program.

A drive device such as, for example, a roller whcih is intended to engage in one of the slots provided on the drive platen is also provided on each moulding unit, for example on the carriage.

The drive platen is mounted on a rotating shaft which, according to a preferred variant, is mounted on a moveable component which travels along a slide which is integral with the fixed framework. This slide can be rectilinear or circular. The slide is preferably adjustably hinged to the fixed framework or so mounted as to make it possible to move it in a direction at right-angles to the direction of travel of the moveable component. Where the track of the moulding units consists of a circular platen over the entire path, the hinge point of the slide which carries the rotary shaft of the drive platen is preferably located along the axis passing through the centre of this circular platen.

The moulding units can furthermore be equipped with devices such as ejectors and deflashing devices, the correct functioning of which can be controlled by adjustable fixed devices mounted on the fixed framework, or by a program.

When putting the apparatus according to the invention into operation, the number of moulding units with which it has to be fitted is first determined so as to define the number of slots which must be present on the drive device. This number of moulding units is a function of the size of the moulded articles which it is desired to produce and of a series of parameters such as the desired productivity, the speed of rotation of the drive device, the output of the parison feed installation, the cooling of the moulding units, the nature of the thermoplastic employed, and the like.

After having mounted each moulding unit on the track and in one of the slots provided on the drive platen, the closing position of the moulding units as they travel along the track is then determined. This position must be such that, at the moment it closes, each moulding unit can enclose a portion of the continuous tubular parison with which the apparatus is fed. In general, the closing position is fixed to coincide with the time at which each moulding unit aligns itself along the direction of the feed parison, this direction of course being a function of the extrusion installation chosen to feed the apparatus.

The closing point can be varied by means of either the programmer or the position of the device fixed to the framework which controls the closing of the blow-moulding units.

It should be noted that this adjustment is in principle definitive and that once it has been made the moulding units will always close in the same position of their trajectory along the track, regardless of the number of moulding units.

Thereafter, the apparatus is adjusted by varying the position of the shaft for driving the moulding units relative to the fixed framework, starting relative to the track of the moulding units, this adjustment being made, for example, by adjusting the slide which carries this shaft.

The adjustment must be made in such a way that when a moulding unit is in the closing position, that is to say when it is aligned with the parison intended to feed the apparatus, it is practically in contact with the already closed moulding unit which precedes it. Furthermore, the position of the platen drive shaft must be such that at that moment the distance separating these two moulding units passes through its minimum value.

The adjustments relating to controlling the opening of the moulding units, the functioning of the ejectors and/or the functioning of the deflashing devices, and those relating to the feed of blowing fluid to the moulding units, can then be made, these adjustments being in principle definitive.

When these various adjustments have been made, the apparatus is ready to be put into operation.

If subsequently it is desired to produce articles of different sizes, it suffices to replace the moulds with which the moulding units are equipped and then solely to shift the rotating shaft of the drive platen as has been described above by adjusting the slide which supports it.

On the other hand, if it is desired to change the number of moulding units with which the apparatus is equipped, it is necessary to fit the apppartus with the desired number of moulding units by adding or removing one or more moulding units, to remove the drive platen and replace it by another equipped with an appropriate number of slots, to engage the successive units in these slots and finally to shift the rotating shaft of the drive platen as described above by adjusting the slide which supports it.

These various changes are made very easily and do not require the use of highly qualified personnel.

The apparatus can also be used for the production of oriented hollow bodies possessing improved mechanical properties. For this purpose it suffices to provide a heat-treatment device, if necessary, for the parison 7 as it leaves the extrusion head 8 and to regulate the drive device of the apparatus to a given speed so that the moulds exert a sufficient tension on the parison to orient it longitudinally.

The apparatus according to the invention and its operation are furthermore illustrated by the practical embodiments which now follow. However, it is of course understood that these are given purely by way of illustration and without implying a limitation, because the apparatuses decribed below can be subjected to numerous modifications in detail which do not go outside the scope or spirit of the invention.

Figure 2:
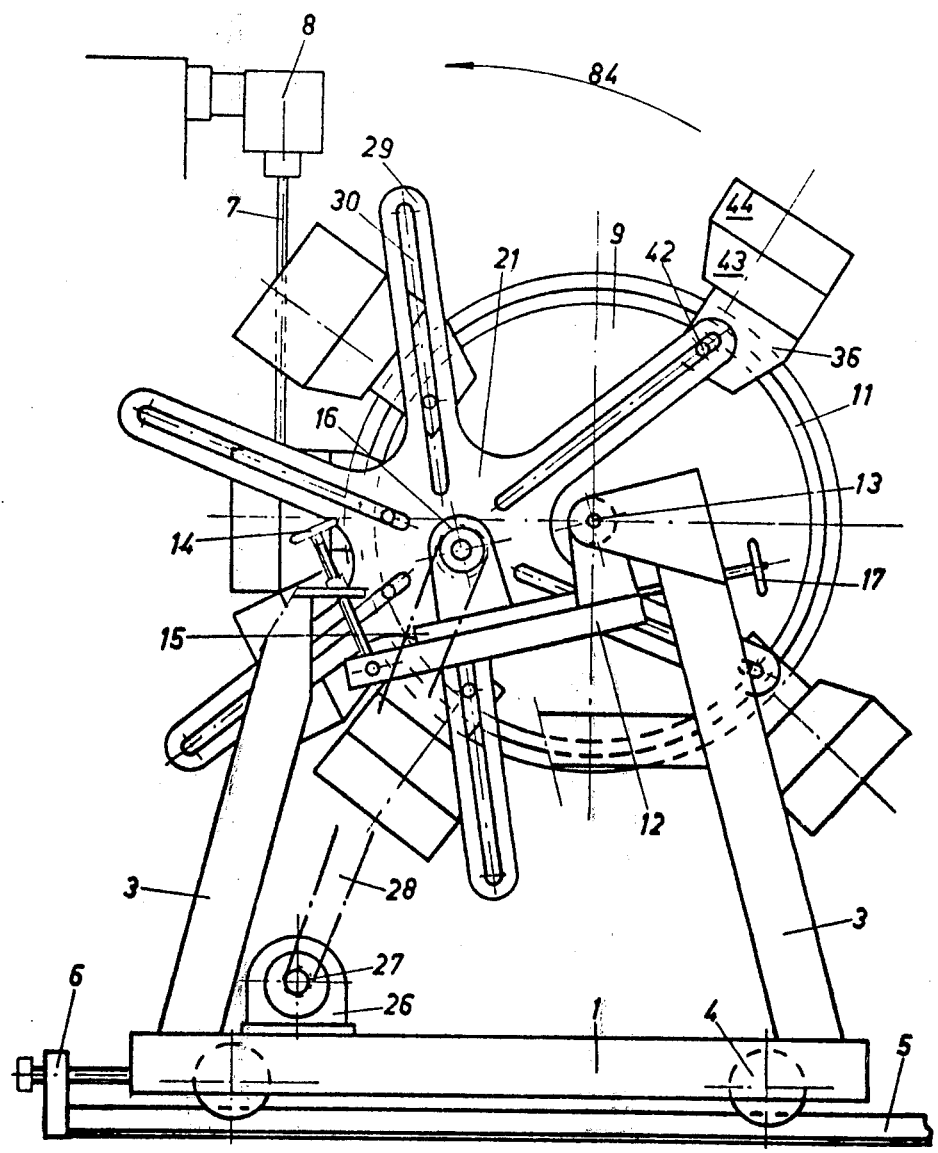
Figure 3:
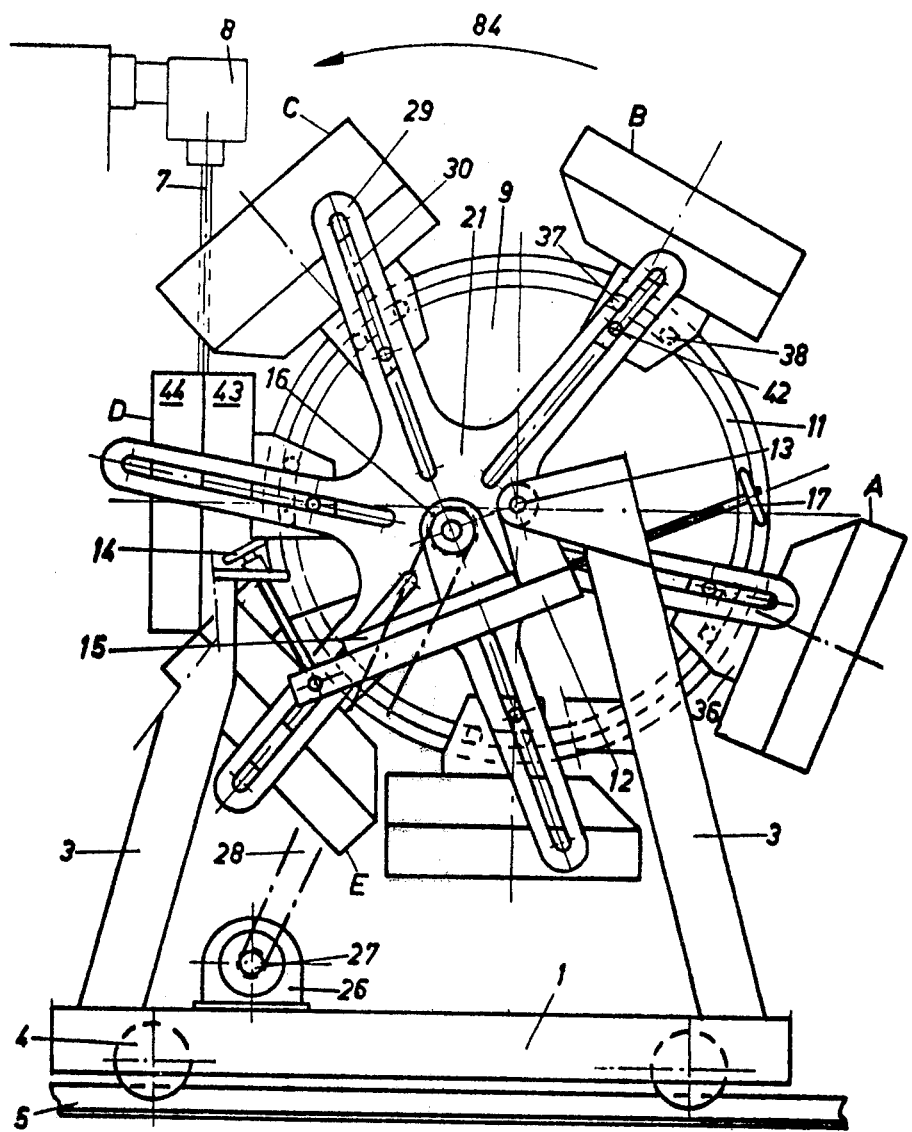
Figure 4:
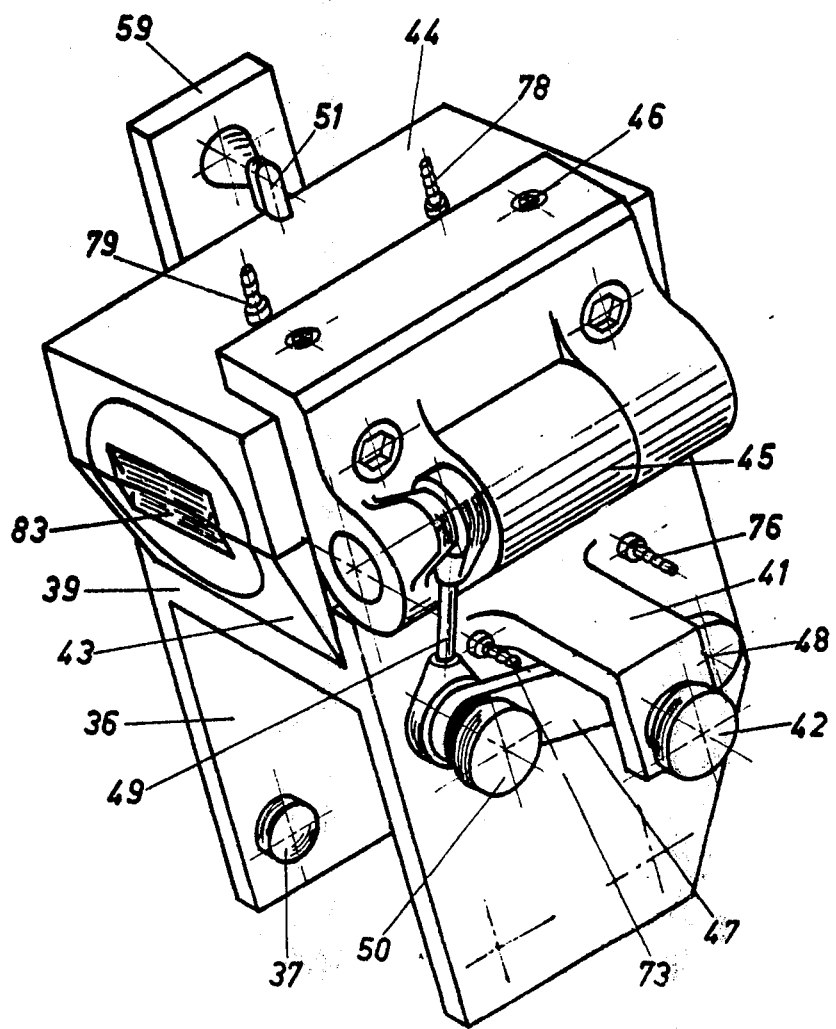
Figure 5:
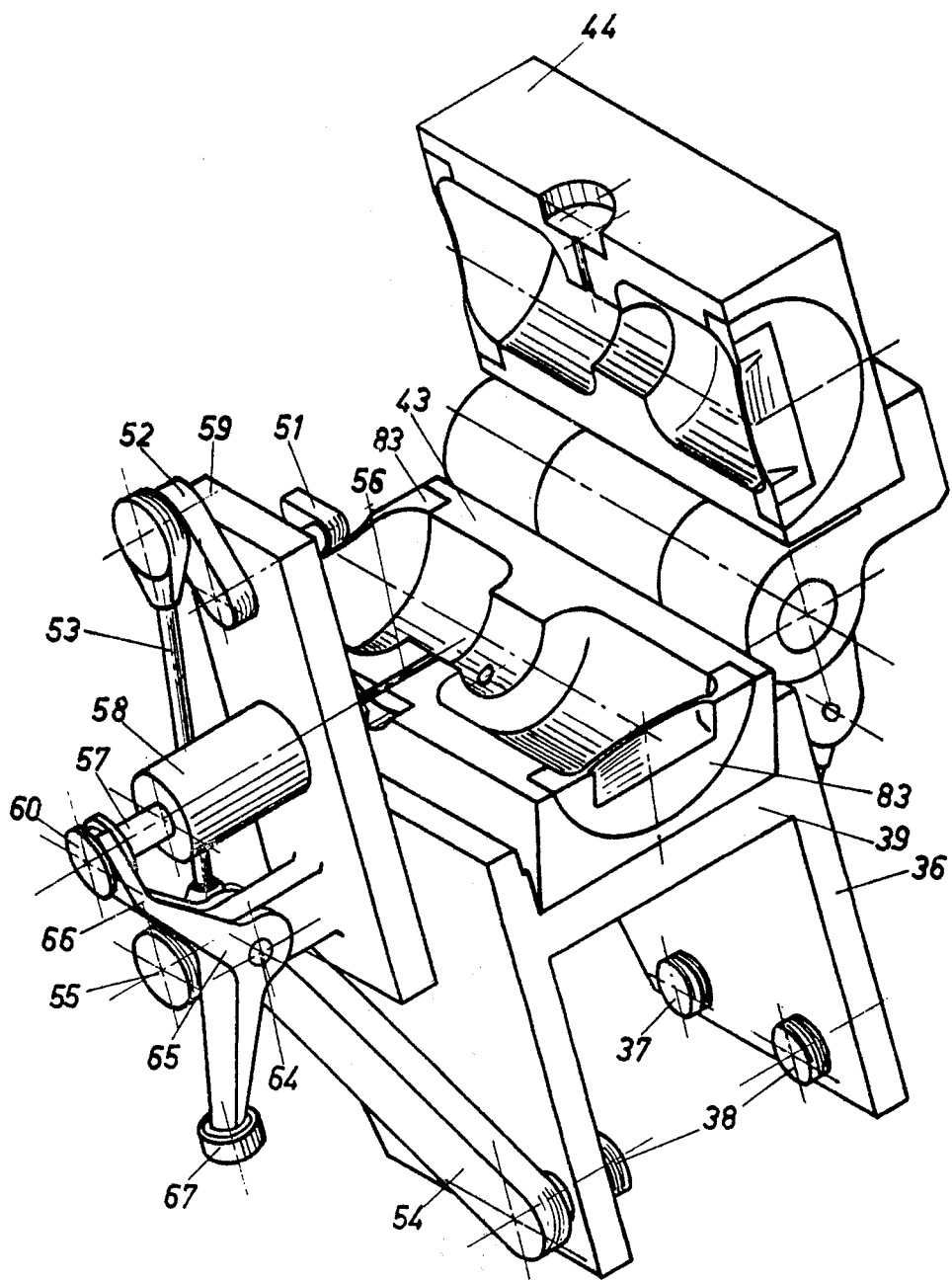
Figure 6:
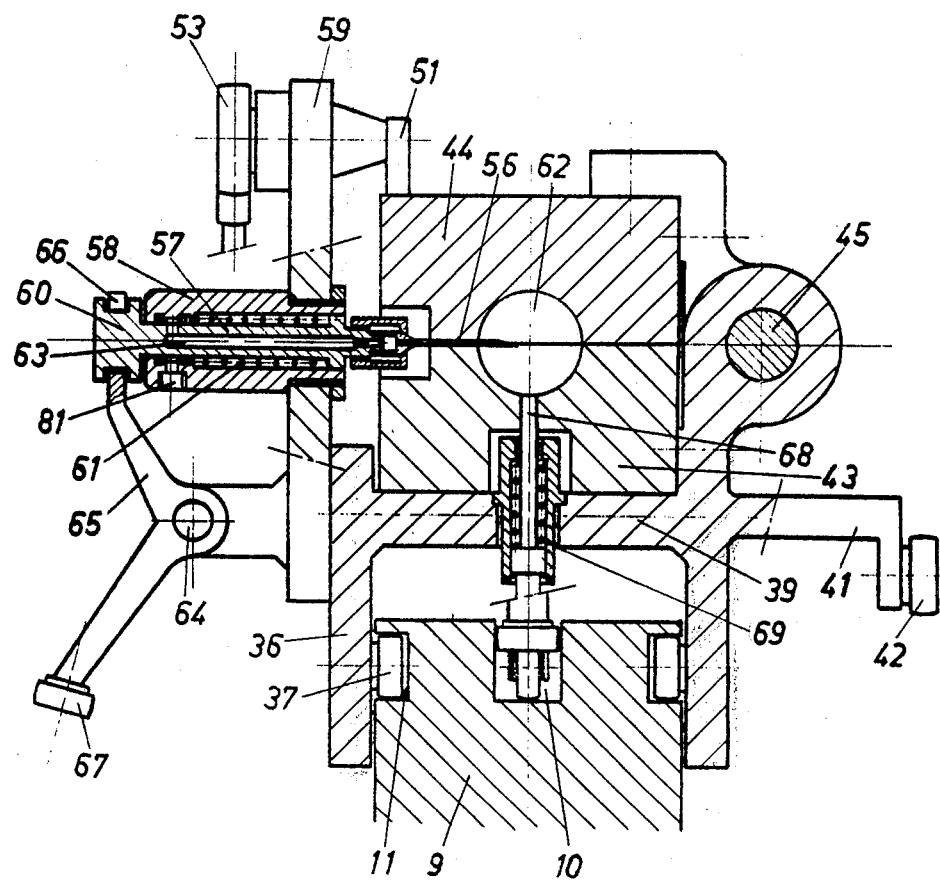
Figure 7:
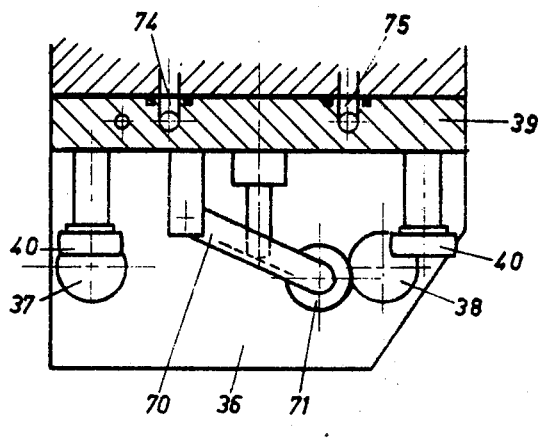
Figure 8:
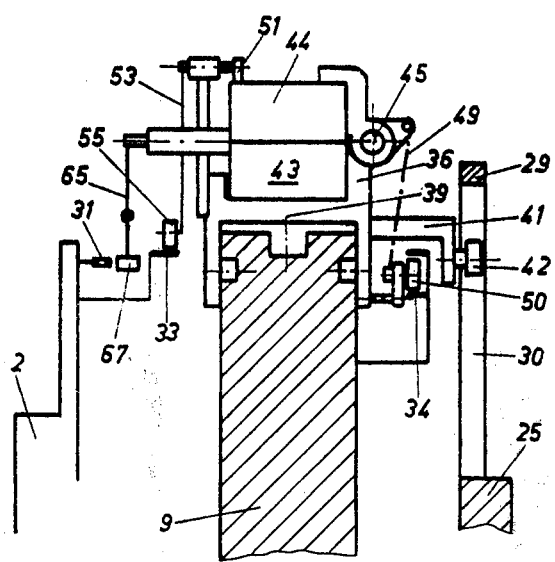
Figure 9:
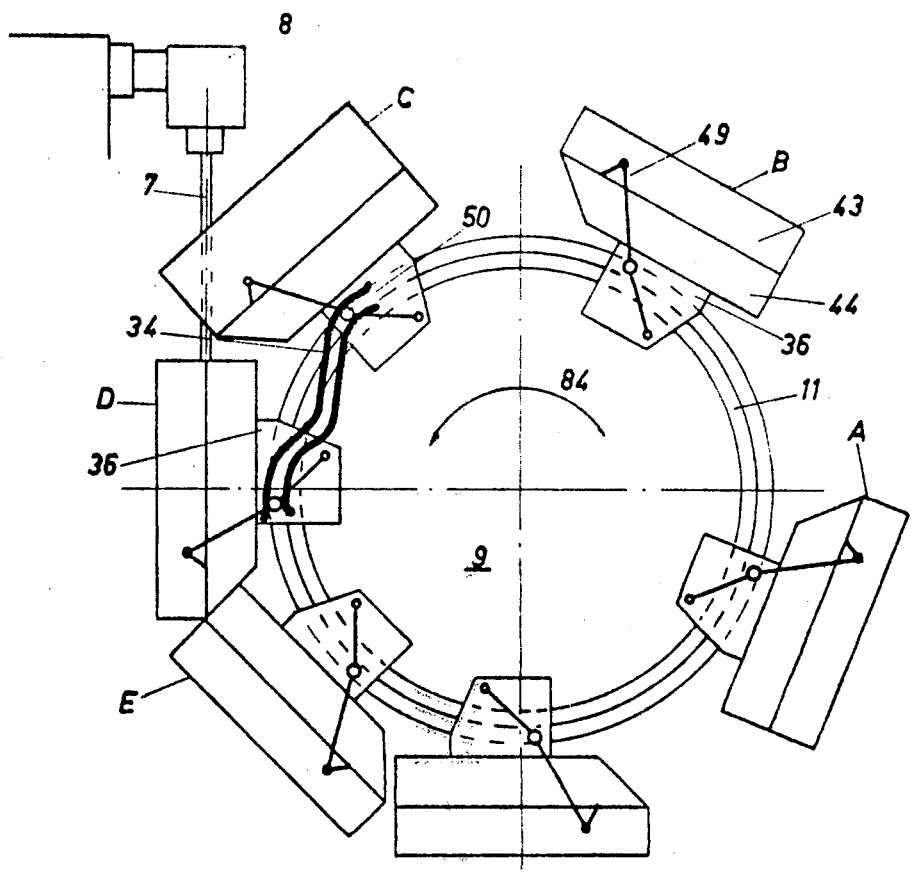
Figure 10:
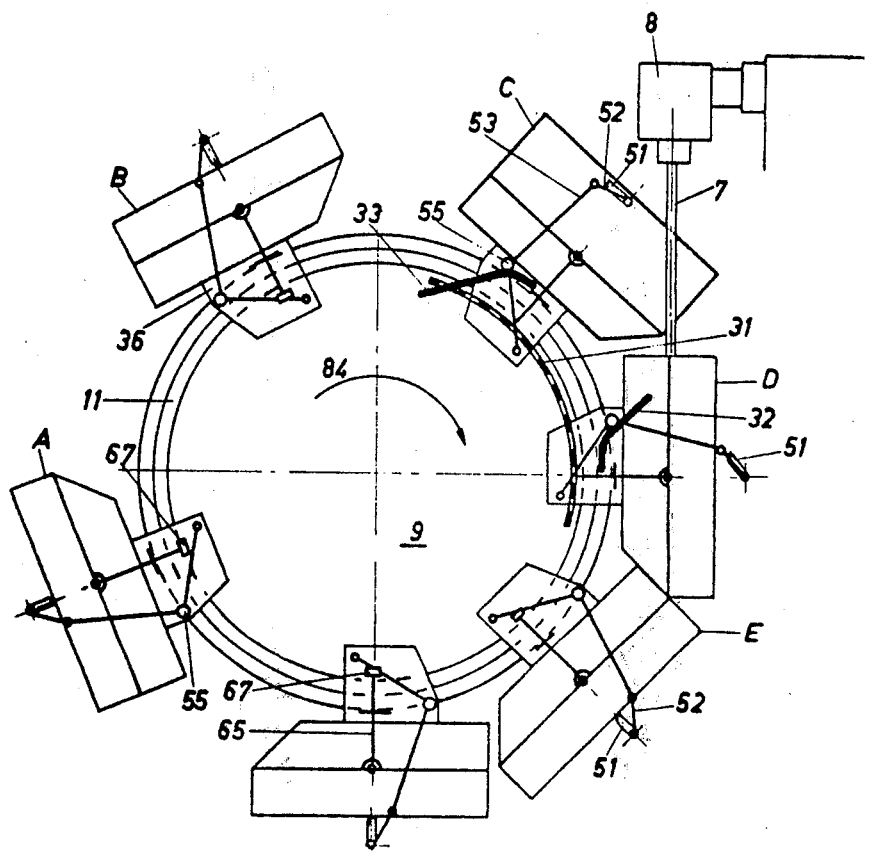
Figure 11:
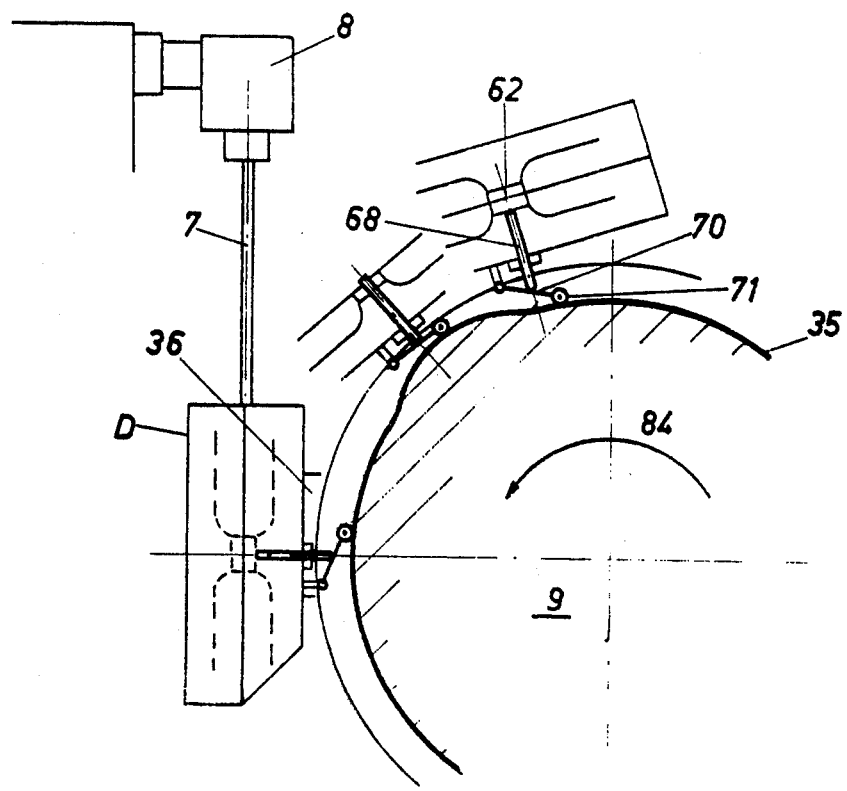
Figure 12:
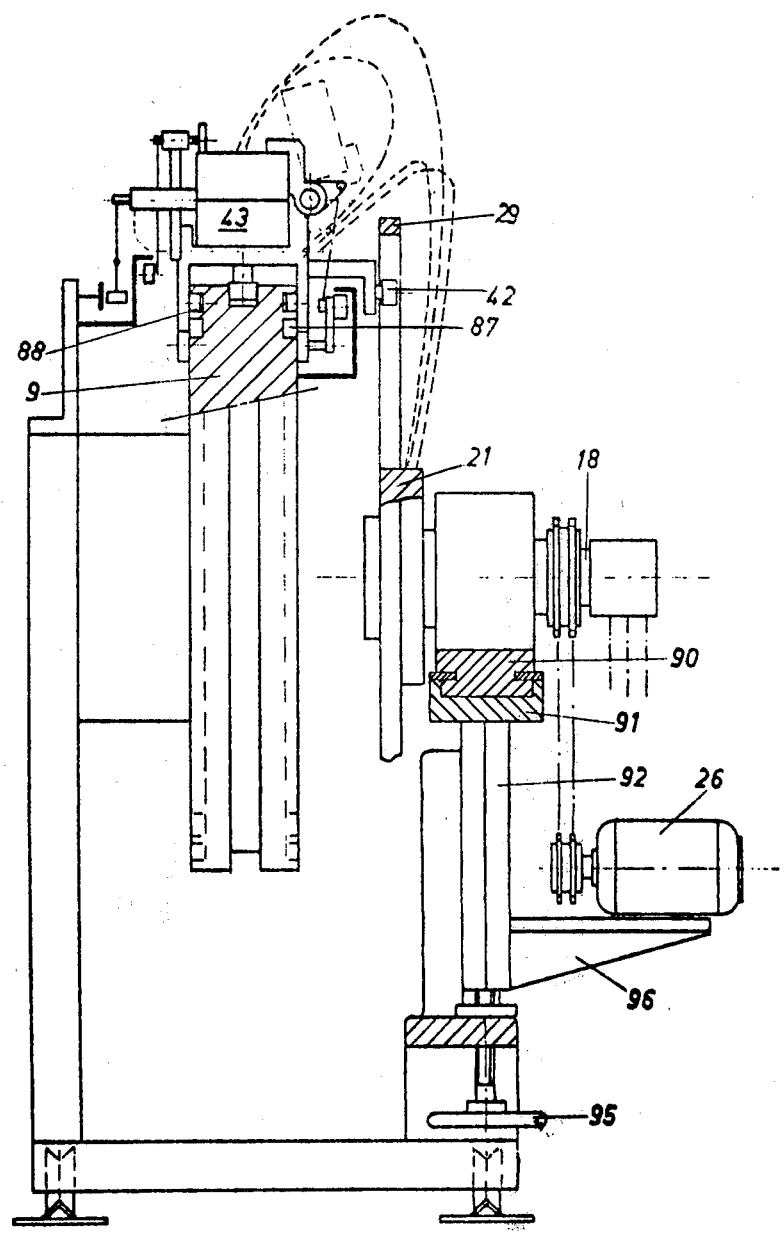
Figure 13:
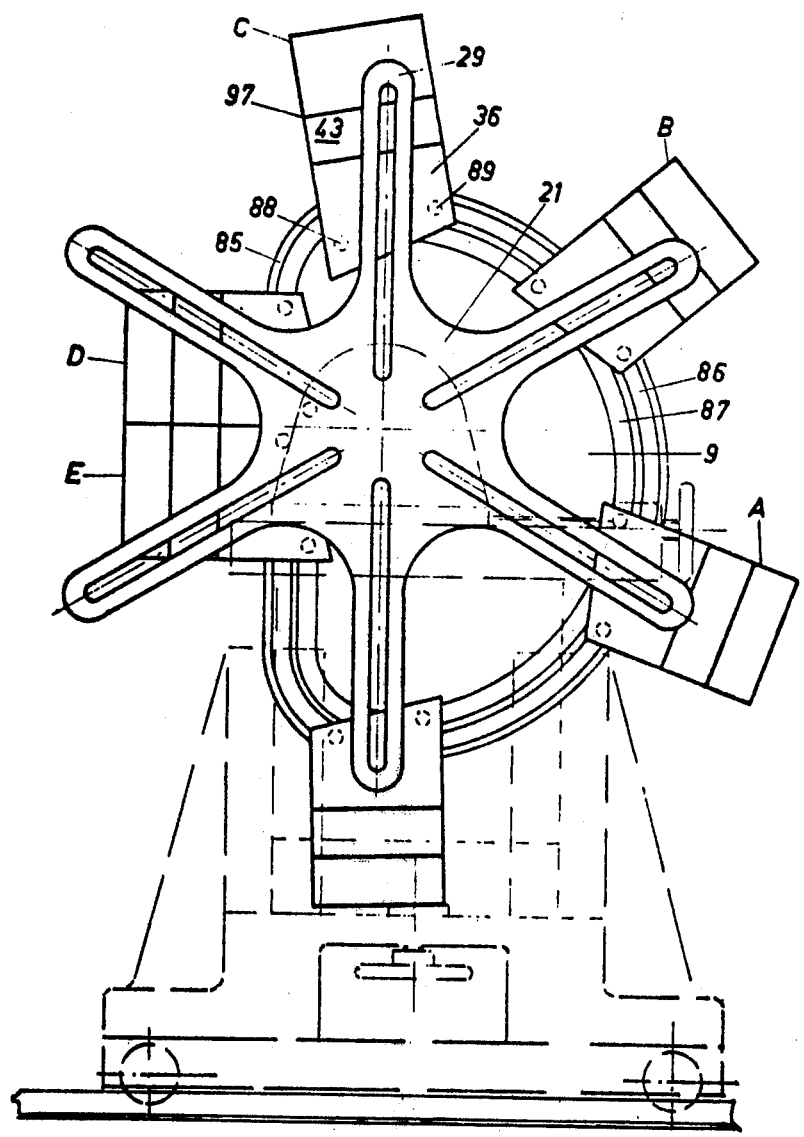
Figure 14:
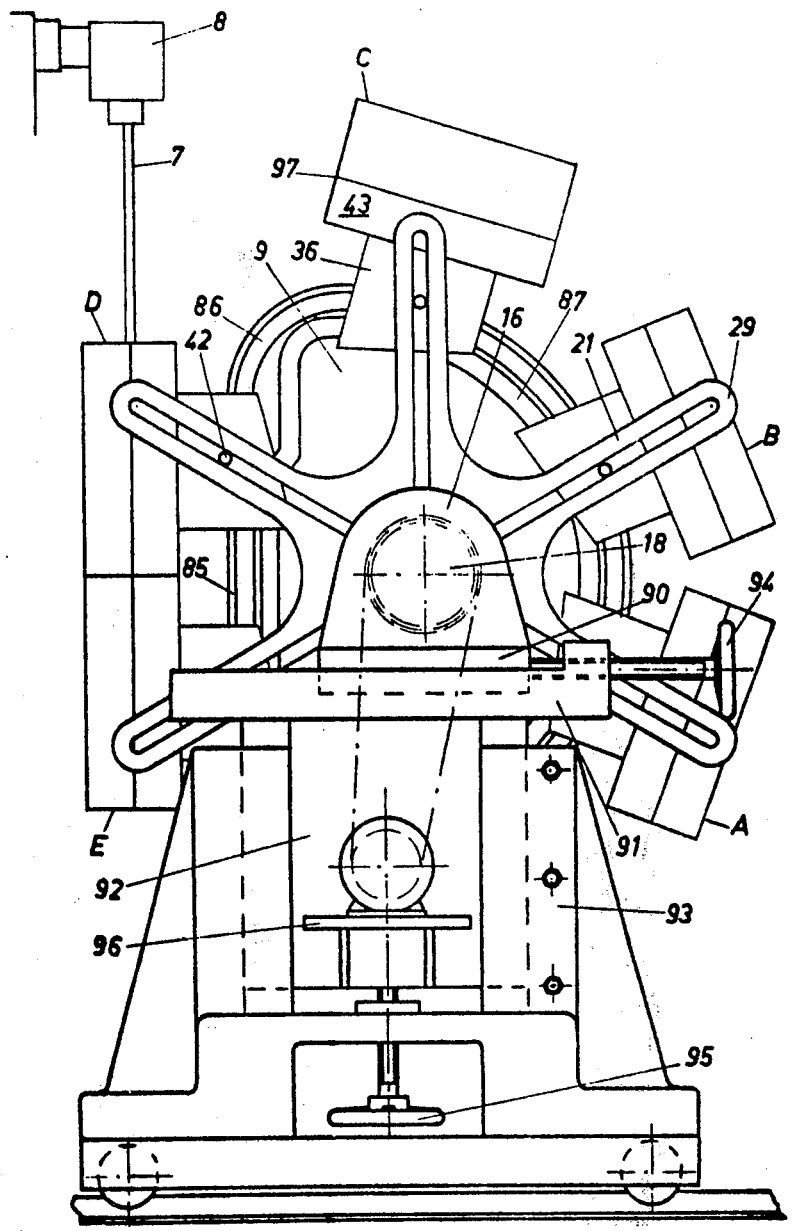

In this description, refrence will be made to the figures in the attached drawings, in which:

FIG. 1 is a face-on view of a moulding apparatus for hollow bodies, according to the invention, equipped with a circular track, FIG. 2 is a right-hand profile view of the same apparatus equipped with relatively short moulds, FIG. 3 is a view identical to FIG. 2, but with the apparatus equipped with relatively long moulds, FIG. 4 is a perspective view of a moulding unit which can be mounted on the apparatus of FIG. 1, FIG. 5 is a perspective view from another angle, of the moulding unit shown in FIG. 4, FIG. 6 is a cross-sectional view of a moulding unit mounted on the apparatus, FIG. 7 is a detailed view of a moulding unit, FIG. 8 is a partial face-on view of the apparatus represented in FIG. 1 and showing the position of the control cams, FIG. 9 is a partial right-hand profile view of the apparatus represented in FIG. 1, showing the profile of the cam which controls the opening and closing of the moulds, FIG. 10 is a partial left-hand profile view of the apparatus represented in FIG. 1, showing the profiles of the cams which control the locking and unlocking of the moulds and control the blowing needle with which these moulds are equipped, FIG. 11 is a partial right-hand profile view of the cam which controls the ejector with which each moulding unit is equipped, FIG. 12 is a face-on view of an apparatus of moulding hollow bodies in accordance with the invention, equipped with a track for the moulding units, of which track a portion is rectilinear, FIG. 13 is a right-hand profile view of the apparatus shown in FIG. 12, equipped with relatively short moulds and FIG. 14 is a view identical to FIG. 13, but with the apparatus equipped with relatively long moulds.

I. FIRST EMBODIMENT (FIGS. 1 TO 11)

A. Description of the apparatus

Referring to FIGS. 1 to 3, it is noted that the apparatus for moulding hollow bodies comprises a fixed framework consisting of a sole-plate 1, of a left-hand side support 2 and a right-hand side support 3.

The sole-plate 1 can however be equipped with rollers 4 which allow the apparatus to be moved on rails 5 optionally provided with adjustment stops 6 and allowing correct alignment of the apparatus relative to the extrusion installation, of which the head 8, shown schematically, vertically delivers the continuous tubular parison 7 intended to feed the apparatus.

The track for the moulding units, which forms part of the stand of the apparatus and consists, in the present state, of a platen 9 of circular shape, is fixed to the left-hand side support. A groove 10 is machined in the edge of this platen.

A groove 11 which strikes the rim of the platen is also provided on each face of the platen 9.

A rectilinear slide 12 which can be pivoted about an axle 13 by means of a regulating screw 14 is hinged to the side support 3. The moveable component 15 corresponding to this slide and supporting a bearing 16 can be shifted by means of the regulating screw 17.

It should be noted that the axle 13 coincides with the axis of the platen 9 and that the straight line joining this axis to the axis of the bearing 16 is parallel to the slide 12.

A rotating shaft 18 passing through the bearing 16 carries, on one side, a rotary seal 19 which serves to distribute the fluids, namely the mould cooling water and the blowing fluid, and a sprocket wheel 20, and, on the other side, a drive platen 21 for the moulding units and a distributor 25.

The rotary seal 19 is equipped with three connections 22, 23 and 24, of which two provide the circulation of cooling fluid for the moulds and the third makes it possible to introduce fluid under pressure for blowing the hollow bodies.

Pipelines located inside the shaft 18 connect the rotary seal 19 to the distributor 25 which is located in front of the drive platen 21 of the moulding units.

The shaft 18 is rotated by means of a variable speed motor 26 fixed to the sole-plate 1 of the fixed framework of the apparatus, and via sprocket wheel 20 and 27 and a chain transmission 28.

The drive platen 21 of the moulding units is keyed onto the end of the shaft 18 which faces the platen 9. The drive platen comprises a certain number of radial arms 29 equipped with slots 30. The number of arms and slots provided is equal to the number of moulding units with which the apparatus is equipped and these slots form equal angles between them.

The cams 31 which control the withdrawal of the blowing needles, and the two cams 32 (FIG. 10) and 33 which control the locking and unlocking of the moulds with which the moulding units are equipped are also fixed to the left-hand side support 2.

Finally, the cam 34 which controls the opening and closing of the moulds is fixed to the platen 9 which forms the track for the moulding units, while a cam 35 (FIG. 11) which controls the ejection of the moulded hollow bodies is seated in the groove 10 machined in the edge face of the platen 9.

Referring more particularly to FIGS. 3 to 7, it is seen that each moulding unit comprises a mould carriage 36 in the shape of an inverted U.

Two rollers 37 and 38 which engage in the grooves 11 provided on the faces of the platen 9 are provided on each of the two internal faces of the side walls of the mould carriage.

Two rollers 40 for transverse retention of the carriage are also provided on the internal face of the cross-piece 39 of the mould carriage and engage in the groove 10 machined in the edge face of the platen 9 (FIG. 7).

A drive arm 41 is provided on the external face of the side wall of the mould carriage located on the side of the driven platen 21 of the moulding units, and this arm is equipped with an idling roller 42 which engages in the slot 30 of one of the radial arms 29 of this same drive platen.

Each mould with which the moulding unit is equipped consists of two half-moulds of which one, 43, is fixed and mounted on the upper face of the cross-piece 39 of the mould carriage 36 and the other, 44, is moveable and connected to the mould carriage by a hinge system 45.

The moulds thus open and close in book fashion and the adjustment screws 46 make it possible to ensure that the two half-moulds line up during fitting.

The mechanism for controlling the closing and opening of the mould consists of a rocking lever 47 pivoting about the axle 48 fixed to the external face of the side wall of the mould carriage located on the side of the drive platen of the moulding units 21, of the link rod 49 integral with the rocking lever and with the moveable part of the hinge 45, and of the roller 50 which can be moved by the fixed cam 34 which controls the closing and opening of the moulds.

The mechanism for locking and unlocking the moulds when the latter have been closed consists of a bolt 51 which is actuated over a quarter-turn and which by virtue of its appropriate shape locks the moveable half-mould 44 onto the fixed half-mould 43 in the closed mould position. This bolt is controlled by a device comprising a lever 52, a link rod 53, a rocking lever 54 and a control roller 55 which can be moved upwards by the fixed locking cam 32 or downwards by the fixed unlocking cam 33.

In the particular embodiment described, as can be seen in FIGS. 5 and 6, the moulds are double-cavity moulds and the parison enclosed in a mould and sealed at its ends is shaped by means of a moveable hollow needle 56 which passes through the wall of the parison and allows a fluid under pressure to be injected.

As can be seen in FIG. 6, the hollow needle 56 is mounted on a support 57 which slides in a cylinder 58 fixed to a support plate 59 which is itself firmly fixed to the mould carriage 36. The lever 52 of the mechanism for locking and unlocking the mould also passes through this support plate 59.

The support of the hollow needle 57 passes through the cylinder 58 and terminates in a head 60 which has a peripheral groove.

In the normal position, a spring 61 which rests against the bottom of the cylinder 58 pushes the hollow needle support 57 to the right so that the needle 56 is inserted into the mould cavity 62. In this position, the internal channel 63 of the support 57 is connected to a fluid under pressure via the connection 81 and the flexible hose 82 (FIG. 1) connected to the distributor 25.

On the other hand, if the hollow needle support 57 is moved to the left, against the action of the spring 61, the needle 56 is withdrawn from the mould cavity and the supply of fluid under pressure to this needle is automatically interrupted.

This retraction movement of the blowing needle 56 can be achieved by the lever 65 pivoting about the axle 64, one of the arms of this lever being provided with a fork 66 which engages in the peripheral groove of the head 60 of the hollow needle support 57, while the other arm is equipped with a roller 67 which can be actuated by the fixed cam 31 which controls the retraction of the needle and is fixed to the left-hand side support 2 of the framework of the apparatus.

Each half-mould 43 is furthermore equipped with a device which allows the moulded hollow bodies to be ejected when the mould has been opened completely.

Referring to FIGS. 6, 7 and 11, it is seen that the rod 68 of the ejector passes through the fixed half-mould 43 and the cross-piece 39 of the mould carriage and that in the normal position the ejector is retracted under the action of the spring 69. Under the action of the lever 70, this ejector (FIG. 7) can be pushed upwards and emerge in the mould cavity 62 whilst the roller 71 is actuated upwards by the fixed cam 35 controlling the ejector and located in the groove 10 of the platen 9.

It is obviously essential that the transverse retaining rollers 40 of the mould carriages should be of such length that they cannot come into contact with the cam 35 which controls the ejector.

According to a preferred embodiment, the ejector 68 is, in the rest position, slightly retracted from the mould cavity 62. In this way, during blowing of the part of the parison trapped in the mould, the wall of this parison flows into the cavity located above the upper edge of the ejector and forms a means of anchoring the blown hollow body in the fixed half-mould. If necessary, an undercut can be provided on the ejector cavity to facilitate anchoring the moulded article. Hence, when the mould opens, the moulded article remains anchored in the fixed half-mould and the ejector can perform its work.

The series of half-moulds are cooled by circulating cooling fluid.

This cooling fluid is introduced through the connection 22 in the rotary seal 19, passes into the distributor 25 and from there travels through the flexible hose 72 to the connection 73 of the fixed half-mould, traverses the hollow channel 74 in the cross-piece 39 of the mould carriage (FIG. 7) and is introduced into the cooling cavities of the fixed half-mould 43. The fluid is then withdrawn from these cavities through the channel 75 and passes, via the connection 76, flexible hose 77 and connection 78, into the cooling cavities of the corresponding moveable half-mould 44. Finally, the fluid is removed from these cavities via the connection 79 and the flexible hose 80 and passed to the distributor 25 and then to the rotary seal 19 from where it is discharged through the connection 23.

The distributor 25 obviously comprises a number of outlets and inlets equal to the number of moulds which are to be cooled.

The fluid under pressure required for blowing the parison is also introduced into the rotary seal 19 via the connection 24, passes into the distributor 25 and is fed to the blowing needles by flexible hoses 82.

The cam 34 which controls the closing and opening of the moulds is so profiled that these operations take place gradually and smoothly. Hence, the moulds can be manufactured from light alloys. However, their joined-on bases 83 are preferably made of hard steel and their edge which comes into contact with the parison when closing the moulds is chamfered to held the separation of the cut-off pieces.

B. Operation of the apparatus

The operation of the apparatus described can be explained most simply by considering the various stages which take place successively when a mould leaving, for example, position A (FIG. 3) executes a complete rotation about the platen 9 and returns to this position, the rotation being executed, if one refers to FIG. 3, in the anti-clockwise direction, that is to say in the direction indicated by the arrow 84.

Furthermore, it is assumed that the apparatus is functioning in actual operation and that all the conditions combine not only to enable the apparatus to function correctly but also to enable the extrusion apparatus associated therewith to supply a tubular and continuous parison which can be converted, by blowing in the moulds, into hollow bodies of the desired shape.

In position A, the mould is closed and locked. At that stage it contains a hollow body which has already been formed by blowing during the preceding cycle of operations and which has virtually been cooled to a temperature which allows it to be released from the mould.

The needle 56 is pressed into the mould cavity 62 and is in connection with a source of fluid under pressure.

Finally, the ejector 63 is in the retracted position as shown in FIG. 6.

The arms 29 of the rotary drive platen 21, in the slots 30 of which arms are engaged the rollers 42 which drive the mould carriages 36, communicate their rotary movement to the moulds and these travel along the periphery of the platen 9 which constitutes their track.

During the travel of the mould from position A to position B, the roller 67 encounters the cam 31 which controls the retraction of the blowing needle 56 and this cam tends to bring this roller closer to the mould carriage. Hence, the lever 65 pivots and the needle 56 is retracted from the mould cavity 62. When the needle 56 commences its retraction movement, its supply of fluid under pressure is interrupted automatically as is shown in FIG. 6.

When the needle 56 is withdrawn from the mould cavity 62, the fluid pressure contained in the moulded hollow body can escape through the perforation left by the needle in the wall of the parison and the interior of the hollow body is thus gradually returned to atmospheric pressure.

While the mould continues its travel to position B, the roller 55 engages with the fixed unlocking cam 33 and causes the bolt 51 to rotate through a quarter of a turn and hence the mould to unlock.

At the same time, the roller 50 engages with the cam 34 which controls the opening and closing of the mould.

The initial part of this cam is profiled so as to keep the mould closed until it has been completely unlocked and then to cause it to open gradually when the mould passes beyond position B.

During the gradual opening of the mould, the moulded hollow body remains fixed in the fixed half-mould 44 because a portion of the wall of the parison has entered the seat of the ejector 68 and is anchored there.

When the mould is practically open, the roller 71 which controls the ejector 68 strikes the fixed cam 35 which controls the ejector (FIG. 11) and the ejector gradually enters the mould cavity 62, thus causing the ejection of the moulded hollow body between positions B and C.

Hence, the mould, when it has arrived in position C (FIG. 11) is unlocked, fully opened and freed from the hollow body moulded during the preceding cycle, the blowing needle 56 being in the retracted position.

When the mould leaves position C, the cam 35 which controls the ejector 68 moves away under the roller 71 and the ejector 68 resumes its initial retracted position under the action of its spring 69.

While the mould travels towards position D, it starts to close again by virtue of the profile given to the control cam 34 and when the mould is in line with the parison 7 the cam 34 causes the mould to close completely onto the parison introduced between the two half-moulds. During the last stage of the closing movement, the attached bases 83 of the mould shear the parison so as to thin it very greatly and seal the ends of the portion of parison trapped in the mould cavity.

When the mould is completely closed, the roller 55 encounters the cam 32 which controls the locking and which progressively draws this roller towards the centre of the platen 9 and hence causes the rotation of the bolt 51 which locks the mould in the closed position.

Thus, in position D, the mould is closed and locked.

Furthermore, it is seen (FIG. 2) that at that point the mould almost rests against the mould which precedes it (position E) and that hence the portion of parison between these two moulds is reduced to the minimum.

When the mould leaves position D (FIG. 10), the roller 67 which controls the blowing needle 56 slides abruptly from its control cam 31 and the blowing needle 56, under the action of its spring 61, instantly enters the mould cavity 62 and at the end of its travel is again placed in connection with the source of fluid under pressure, thus permitting the blow-moulding of the portion of parison trapped in the mould.

Furthermore, the roller 50 (FIG. 9) which controls the closing and opening of the mould leaves the control cam 34, which has no effect on the mould because the latter remains locked in the closed position.

Finally, the preceding mould which leaves position E gradually separates from the mould which follows and it causes the portion of parison between these two moulds to break.

When the mould leaves position E it, in turn, gradually separates from the mould which follows it and thus causes the portion of parison which is between these two moulds to break, and from that moment the hollow body enclosed in the mould is completely separated from the parison 7.

Finally, while the mould continues its travel towards position A, where a new cycle recommences, the blown hollow body is cooled under pressure, with the mould remaining closed and locked.

It should be noted that the various control cams can easily be adjusted and that this adjustment is definitive regardless of the height of the moulds or of their number.

On the other hand, if one wishes to change the height of the moulds, it is necessary to readjust the position of the rotary shaft of the drive devices by adjusting the regulating screws of the slide which carries it.

This adjustment can easily be made in the following manner, which is described with reference to FIGS. 2 and 3.

After having changed the moulds, the slide 12 is brought into a position such that it is perpendicular to the direction of the parison which feeds the apparatus. For this purpose, the slide is pivoted about its hinge point by adjusting the regulating screw 14. In the particular case illustrated in FIGS. 2 and 3, it suffices to bring the slide into the horizontal position, and this position can be indicated by a reference mark on the platen 9.

Thereafter, the drive platen 21 is turned so that the line bisecting the angle formed by two successive slots is at right-angles to the direction of the parison which feeds the apparatus. This latter operation can be made easy if, for example, platen 9 is graduated in degrees.

After having clamped the drive platen, the two moulds driven by these two slots are then brought into contiguity by adjusting the regulating screw 17.

When this condition is fulfilled, the slide 12 is again pivoted by adjusting the regulating screw 14 so as to bring the rear mould into the closed position.

When this condition is fulfilled, the drive platen can be unclamped and the apparatus can be put into operation.

If, on the other hand, it is desired to change the number of moulding units with which the apparatus is equipped, it is necessary in addition to introduce or remove the desired number of moulding units and change the drive platen before adjusting the position of the shaft of the drive platen as described above.

The apparatus which has just been described can optionally be simplified.

Thus, for example, if the apparatus is only used with a constant number of moulding units, it is found that in accordance with the height of the moulds with which the said apparatus is equipped, the axis of the shaft of the drive platen moves parallel to itself along a circumferential portion which is parallel to the platen forming the track of the moulding units and intersecting the axes passing through the centre O of this platen and through the centre P of the roller 42 at the moment when the corresponding mould closes, the center C of this circumference being such that the angle OCP is 360°/N, N being the constant number of moulding units with which the apparatus is equipped.

Hence, if one does not wish to be able to vary the number of blowing units, the slide 12 can be replaced by a fixed circular slide which allows the axis of the shaft of the drive platen to be moved along the trajectory defined above. In that case, the adjustment required when changing the height of the moulds is simplified further because it suffices to bring one mould into the closed position and then to bring the preceding mould into contact with the mould in the closed position by adjusting the moveable part of the slide.

Furthermore, a relatively small movement of the centre of the drive platen along the circular trajectory described above corresponds to the range of mould heights which may be mounted on the apparatus. Hence, it is possible to replace the circular slide by a fixed rectilinear slide so located that the axis of the drive platen can move along the cord of the above mentioned circular trajectory, provided it is not demanded that the moulds should be contiguous in positions D and E.

Finally, it is quite obvious that in the variant which has just been described, it is in no way essential that the trajectory described by the moulding units between positions E and D should be circular. The platen 9 which forms the track hence does not necessarily have to be circular over its entire periphery, even though its portion between position D and E may be circular.

II. SECOND EMBODIMENT

A. Description of the apparatus

For this description, reference is made to FIGS. 12, 13 and 14. The apparatus shown in these figures is very similar to that which has just been described. Hence, only the components which have been modified have been marked in these figures and the description which follows restricts itself to describing these modifications.

As can be seen in these figures, the track of the moulding units consists of a platen 9 of generally circular shape but having a rectilinear zone 85 of suitable length and so located that this zone permits the alignment of two consecutive blowing units square to the extrusion head 8 which feeds the parison 7. Hence, the length of the rectilinear portion of the platen 9 must be at least equal to twice the height of the highest moulds which can be mounted on the apparatus.

Furthermore, each face of this platen 9 is provided with two grooves 86 and 87 which are practically parallel to one another and skirt the periphery of the platen except for the fact that the internal grooves 87 curve slightly inwards towards the centre of the platen 9 at the start of the rectilinear portion of the latter.

It is seen furthermore that the front retaining rollers 88 of each moulding carriage 36 engage in the internal grooves 87 whilst their rear retaining rollers 89 engage in the external grooves 86.

Furthermore, the bearing 16 which supports the shaft of the drive platen 21 of the moulding units is mounted on the moveable part 90 of a slide of which the fixed part 91 is firmly fixed to the moveable part 92 of a second rectilinear slide located at right-angles to the first slide. The fixed part 93 of the second slide is firmly fixed to the framework of the apparatus.

The moveable part 90 of this first slide can be adjusted by means of the regulating screw 94 while the moveable part 92 of the second slide can also be adjusted by means of the regulating screw 95.

As a result, it is thus possible to move the bearing 16 along two directions at right-angles.

Finally, the variable speed motor 26 which rotates the drive shaft 18 is mounted on a support 96 which is firmly fixed to the moveable part 92 of the second slide.

B. Operation

The operation of the apparatus which has just been described is practically identical to that of the apparatus described in the first embodiment. It is thus not necessary again to describe a cycle of operations.

However, attention should be drawn to a particular detail of the operation of this apparatus resulting from the particular shape imparted to the internal grooves 87 of the platen 9.

In effect, when the open mould leaves position C, it is found that the front extremity 97 of the fixed half-mould 43 could strike the parison 7. This impact, which could interfere with good operation, is avoided through the fact that at that moment the front retaining rollers 88 of the mould carriage are drawn towards the centre of the platen 9 because of the particular shape imparted to the internal grooves 87 in which they engage. As a result, the mould carriage executes a swing which moves the front end of the fixed half-mould away from the parison by an amount such that this half-mould is not aligned with this parison. If one wishes to change the height of the moulds with which this apparatus is equipped, it suffices to replace the moulds and then to adjust the position of the rotary shaft of the drive device by adjusting the regulating screws 94 and 95.

This adjustment can be made easily in the following manner:

After having changed the moulds, the drive platen 21 of the mould-carrying units is turned so that the line bisecting the angle formed by any two consecutive radial arms 29 is perpendicular to the direction of the rectilinear portion of the platen 9. This operation can be greatly simplified if the radial arms are graduated. In that case, it suffices in effect to turn the platen 21 so as to bring, along the rectilinear portion of the platen 9, the two drive rollers 42 of two consecutive moulding units opposite the same graduation of their radial arms.

Then, after having clamped the platen in this position, the two moulding units concerned are brought into contact by solely adjusting the regulating screw 94.

The rear mould should then be brought into the closed position by solely adjusting the regulating screw 95.

Finally, when this last operation has been carried out, the drive platen 21 can be unclamped and the apparatus can be put into operation.

If, on the other hand, one wishes to change the number of moulding units, it is additionally necessary to introduce or remove the desired number of moulding units into or from the track and change the drive platen before adjusting the position of the shaft of the drive platen as described above.

The apparatus which has just been described can optionally also be simplified.

Thus, for example, if the apparatus is only used with a constant number of moulding units, it is found that depending on the height of the moulds with which the said apparatus is equipped, the axis of the shaft of the drive platen moves along a straight line parallel to the platen forming the track of the moulding units, intersecting the axis passing through the centre of a roller 42 at the moment that the corresponding mould closes, and forming an angle of 180°/N with a line perpendicular to the rectilinear portion of the track of the moulding units, N being the constant number of moulds with which the apparatus is equipped.

Hence, if one does not desire to be able to vary the number of blowing units the two slides, at right-angles, which support the bearing 16 of the drive platen 21 can be replaced by a single rectilinear slide of which the moveable piece is so located that the axis of the bearing can move along the trajectory defined above.

In that case, the adjustment required when changing the height of the moulds is even easier. In effect, it suffices, after having mounted the desired moulds, to turn the drive platen 21 so as to bring any mould into the closed position and then, while maintaining the drive platen in this position, to adjust the moveable part of the slide so as to bring the preceding mould into contact with the mould which is in the closed position.

The apparatuses of the invention can be used for the manufacture of hollow plastic bodies (flasks, bottles or cans) of very different shapes and heights, provided that a simple and rapid adjustment is made. The apparatuses also allow the number of moulds to be varied. However, regardless of the height and number of the moulds, the losses of plastic are in every case reduced to a minimum in view of the fact that the moulds are contiguous at the moment that they close. These apparatuses are thus particularly valuable where limited runs of hollow bodies are manufactured or where the designs change frequently.

I claim:

1. In a continuous rotary apparatus for blow-moulding plastic hollow bodies, including a fixed framework, moulds, means of opening and closing the moulds and means for introducing a blowing fluid, the improvement comprising:
   a. a fixed track which is integral with the framework;
   b. a plurality of independent moveable moulding units which carry the moulds, and travel successively over the track; and
   c. a device for driving the moulding units, which includes a rotary platen mounted on a shaft, said shaft being moveable relative to the fixed framework and said platen being equipped with equidistant slots which act on the drive devices of the moulding units.

2. Apparatus according to claim 1, characterized in that the track is of such shape that the moulding units execute a closed trajectory of which at least a portion is circular.

3. Apparatus according to claim 1, characterized in that the track is of such shape that the moulding units execute a closed trajectory of which at least a portion is rectilinear.

4. Apparatus according to claim 1, characterized in that the track consists of a fixed platen possessing at least one groove running along its periphery.

5. Apparatus according to claim 4, characterized in that the platen is circular.

6. Apparatus according to claim 4, characterized in that each moulding unit comprises a carriage on which are arranged a fixed half-mould and a moveable half-mould which is hinged to the fixed half-mould by a hinge system, the carraige straddling the edge of the fixed platen which constitutes the track.

7. Apparatus according to claim 6, characterized in that each carriage is furthermore equipped with retaining means, such as rollers which engage in the grooves with which the fixed platen is provided.

8. Apparatus according to claim 1, characterized in that the moveable shaft which rotates the device which drives the moulding units is mounted on a moveable component which travels along a slide which is integral with the fixed framework.

9. Apparatus according to claim 8, characterized in that the slide is hinged to the fixed framework.

10. Apparatus according to claim 8, characterized in that the slide is provided with means which allow it to be moved along a direction at right-angles to the direction of travel of the moveable component.

11. In a continuous rotary apparatus for blow-moulding plastic hollow bodies, including a fixed framework, moulds, means of opening and closing the moulds and means for introducing a blowing fluid, the improvement comprising:

a. a fixed track which is integral with the framework and which provides a closed loop path;

b. a plurality of independent moveable moulding units which carry the moulds and are mounted to travel successively on the track and along the closed loop path;

c. means for driving the moulding units along the closed loop path and which includes a rotary platen mounted on a shaft which can be moved relative to the fixed framework and the closed loop path, said platen having equidistant slots which act on and move the drive devices of the moulding units; and d. means operative on said shaft for moving the location of the platen shaft whereby when the platen shaft is moved different portions of the slots act on the drive devices thereby to vary the distance between moulds along at least a particular portion of the closed loop path.

* * * * *